United States Patent
Singh et al.

(10) Patent No.: US 12,556,763 B2
(45) Date of Patent: Feb. 17, 2026

(54) DYNAMIC MASKING FOR MEDIA PLAYBACK

(71) Applicant: Arlo Technologies, Inc., Carlsbad, CA (US)

(72) Inventors: Rajinder Singh, San Jose, CA (US); Timothy Johnston, Los Gatos, CA (US); Mikio Yves Matsuo, Vancouver (CA)

(73) Assignee: Arlo Technologies, Inc., Carlsbad, CA (US)

( * ) Notice: Subject to any disclaimer, the term of this patent is extended or adjusted under 35 U.S.C. 154(b) by 38 days.

(21) Appl. No.: 18/367,163

(22) Filed: Sep. 12, 2023

(65) Prior Publication Data

US 2025/0088710 A1 Mar. 13, 2025

(51) Int. Cl.
*H04N 21/454* (2011.01)
*H04N 21/431* (2011.01)
*H04N 21/442* (2011.01)

(52) U.S. Cl.
CPC ..... *H04N 21/4542* (2013.01); *H04N 21/4318* (2013.01); *H04N 21/44218* (2013.01)

(58) Field of Classification Search
CPC ........... H04N 21/4542; H04N 21/4318; H04N 21/44218
USPC .......................................................... 725/25
See application file for complete search history.

(56) References Cited

U.S. PATENT DOCUMENTS

| | | | |
|---|---|---|---|
| 10,088,983 B1 | 10/2018 | Qaddoura et al. | |
| 2005/0086069 A1* | 4/2005 | Watson | H04N 21/4755 726/3 |
| 2012/0180107 A1* | 7/2012 | Gammill | G06Q 30/02 709/204 |
| 2012/0246732 A1* | 9/2012 | Burton | G06F 16/784 726/26 |
| 2015/0070516 A1* | 3/2015 | Shoemake | H04N 21/4542 348/207.11 |
| 2016/0007065 A1* | 1/2016 | Peles | H04N 21/23439 725/34 |
| 2016/0066036 A1* | 3/2016 | Felt | G11B 27/34 386/241 |
| 2016/0323643 A1 | 11/2016 | Panchaksharaiah et al. | |
| 2017/0041744 A1* | 2/2017 | McKay | H04W 4/021 |
| 2021/0312118 A1* | 10/2021 | McClendon, Jr. | G06F 3/04812 |
| 2022/0070526 A1 | 3/2022 | Aithal et al. | |
| 2023/0078009 A1* | 3/2023 | Just | G06F 18/24143 482/9 |
| 2023/0224542 A1* | 7/2023 | Panchaksharaiah | H04N 21/4402 725/25 |
| 2024/0147012 A1* | 5/2024 | Nevo | H04N 21/47217 |

* cited by examiner

*Primary Examiner* — Nasser M Goodarzi
(74) *Attorney, Agent, or Firm* — Boyle Fredrickson, S.C.

(57) ABSTRACT

A method of dynamic masking of variably selected portions of the media content based upon real-time audience composition is provided. The method includes the steps of identifying one or more members of an audience for playback of media content. Upon identifying one or more audience members, retrieving corresponding preselected preferences for media playback. Generating a media masking instruction according to the preselected preferences, and outputting to a user device a masked media content correlating to the instruction. The invention additionally relates to a system that implements such a method.

15 Claims, 5 Drawing Sheets

DYNAMIC MASKING FOR MEDIA PLAYBACK

FIELD OF THE INVENTION

This invention relates generally to the dynamic masking of media content during playback, and in particular, to a method of dynamic masking of variably selected portions of the media content based upon real-time audience composition. The invention additionally relates to a system that implements such a method.

BACKGROUND OF THE INVENTION

In the context of consuming audio/video media content, i.e., playback, media content has often been customized for the viewing audience. For example, when a feature film is subsequently broadcast on television it may be altered from the version shown during its theatrical release, in order to conform to desired TV parental guidelines. For example, scenes with nudity, explicit sexual content, or graphic violence may be removed, and dialog may be altered to remove strong profanity. Similarly, music played over the radio may also be modified to remove strong profanity.

Traditionally, modifications to media content are performed prior to broadcast and distribution, thereby ensuring that the media content made available for consumption by a viewing or listening audience conforms to predefined guidelines. For example, a TV channel that wishes to broadcast a feature film with an original motion picture rating of PG-13 under a TV parental guideline rating of TV-PG may modify the content of that film prior to its broadcast release, thereby ensuring that all viewers receive the same TV-PG rated viewing experience. Similarly, a radio channel may broadcast a "clean" version of a song in which strong profanity has been removed and/or modified so that all listeners receive the same listening experience.

However, the manner in which media content is consumed has recently changed with the continued growth of streaming services and internet-based content in lieu of traditional broadcast and cable providers. This updated format of media consumption provides a more individually tailored playback experience. For example, a user may specifically select what content they wish to view at a given time rather than being limited by a broadcast schedule. Similarly, an individual may be able to create an entirely customized song playlist for playback through a streaming music service, rather than listening to a traditional radio station. While such advances in the manner of media content consumption have become ubiquitous, advances in applying content rating and filtering have lagged.

Media providers, including streaming services and internet-based content providers continue to rely upon traditional parental guidance rating systems which display content available for playback according to a user's profile settings. For example, if a child under the age of 14 is viewing media content from a streaming service, their corresponding user profile may limit available content to exclude programs with a TV-14, or TV-MA rating. However, such systems lack the ability to customize media filtering or masking based upon more individualized or specific viewer preferences. For example, some viewers may prefer not to include graphic violence, nudity, explicit sexual content, or strong profanity in their media content consumption, but do not object to the presence of mild profanity. However, without the ability to implement such custom viewer preferences, content may not be made available for playback if it triggers any one or more of the traditional parental guidance rating systems' thresholds.

Furthermore, when more than one individual is consuming media content, for example in a group setting such as a family watching a movie, playback is dictated by the user settings that were applied to the one individual user that was actively logged into the streaming service or internet-based content provider. Accordingly, the media content selected for playback may not be appropriate for all members of the viewing audience. As such, there exists a need for a system and method of identifying members of the viewing audience during media playback and variably masking portions of the media content based upon the audience composition.

To this end, cameras and electrical sensors have long been used as part of monitoring and/or surveillance systems. More recently, cameras have been coupled to electronic sensors to detect triggering events, such as a detected motion, to allow recording of an area once a triggering event has occurred. Video cameras and other related sensors have also been connected to computers with network access to allow advanced processing of the monitored area. Such processing capabilities may include the ability to identify and categorize triggering events occurring within the monitored area. For example, a particular motion triggering event may initiate processing of the captured video content by the system to identify and categorize the motion as being attributable to the presence of a person broadly, or as a particular individual more specifically.

In the context of consuming audio/video media content, it is desirable to provide a system for providing media playback that includes feedback from a monitoring system that allows dynamic and variable masking of one or more portions of the media content during media playback based upon real-time audience composition.

SUMMARY OF THE INVENTION

In accordance with a first aspect of the invention, a system and method of dynamic masking of media content during playback through the use of real-time audience monitoring is provided.

In accordance with the present invention, a method of dynamic masking of variably selected portions of the media content based upon real-time audience composition is provided. The method includes the steps of identifying one or more members of an audience for playback of media content. Upon identifying one or more audience members, retrieving corresponding preselected preferences for media playback. Generating a media masking instruction according to the preselected preferences, and outputting to a user device masked and/or alternate media content correlating to the instruction.

An aspect of the method of dynamic masking of variably selected portions of the media content based upon real-time audience composition may include modifying the masked media content by an alteration to the media masking instruction while outputting the masked media to the user device.

Another aspect of the method of dynamic masking of variably selected portions of the media content based upon real-time audience composition may include the step of identifying one or more members of an audience for playback of media content occurring repeatedly while outputting the masked media to the user device.

Another aspect of the method of dynamic masking of variably selected portions of the media content based upon real-time audience composition may include the masked media content being defined by a combination of at least one primary media chunk and at least one secondary media chunk that each conform to the preselected audience preferences.

Another aspect of the method of dynamic masking of variably selected portions of the media content based upon real-time audience composition may include wherein the preselected preferences are selected from a group consisting of suggestive dialogue, strong profanity, mild profanity, drug use, alcohol use, sexual situations, violence, and nudity.

Another aspect of the method of dynamic masking of variably selected portions of the media content based upon real-time audience composition may include applying a computer visions program to audience monitoring device generated sensor data to generate an audience identification.

In accordance with yet another aspect of the present invention, a system for variably masking portions of media during playback is provided, including an audience monitoring device configured to record and/or live-monitor data from an audience of a user device configured for media playback, a computer vision system configured to identify at least one member of the audience from the data received from the monitoring device, a database of preselected audience preferences configured to provide a masking instruction corresponding to the identified at least one member of the audience, and wherein the user device is configured to output a masked and/or alternate media content during media playback correlating to the masking instruction.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
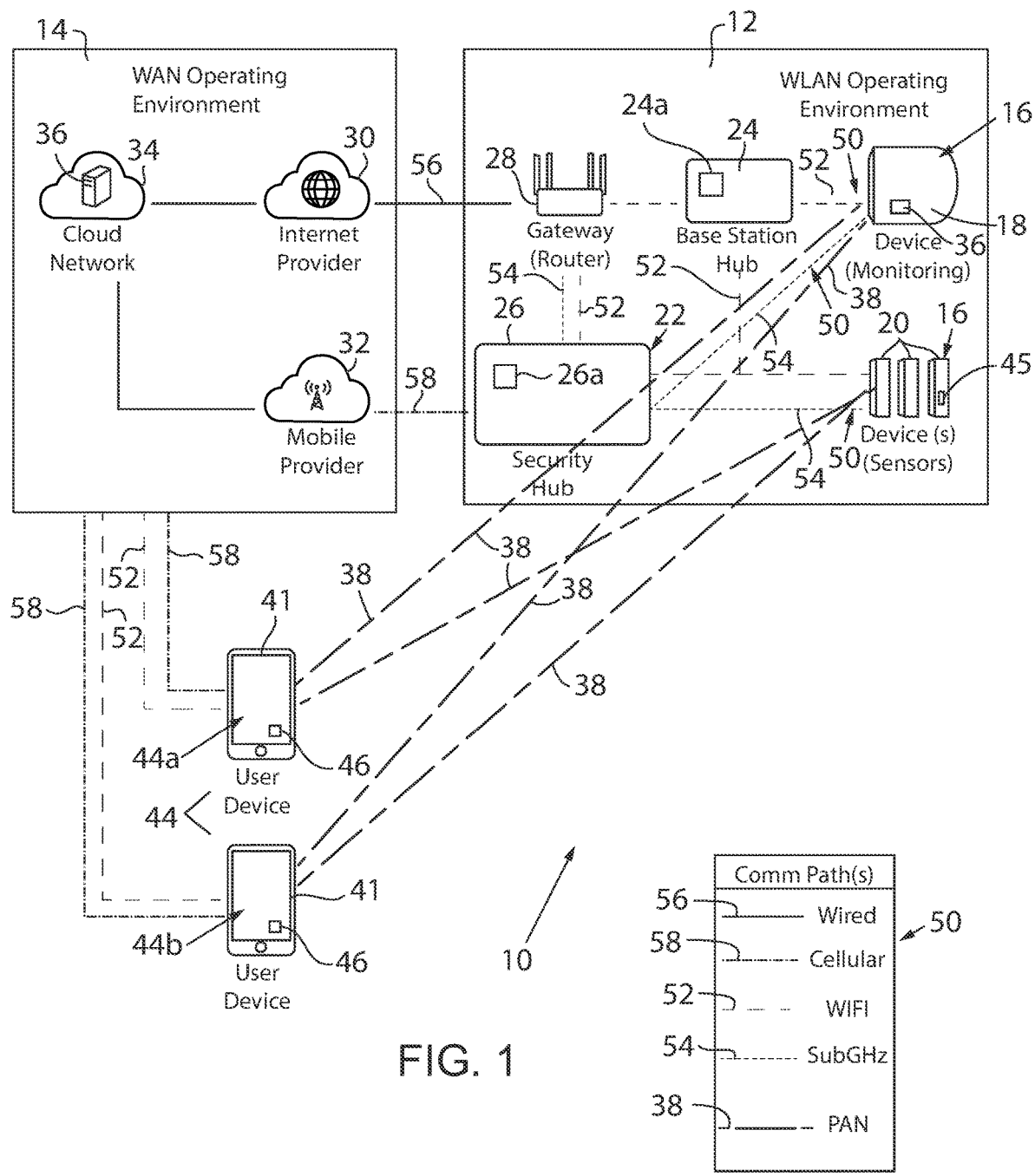
FIG. 1 is a schematic representation of an electronic monitoring system according to aspects of the invention.

Referring to FIG. 1, an electronic audience monitoring system 10 constructed in accordance with an aspect of the present invention is generally designated by the reference numeral 10. Electronic audience monitoring system 10 is implemented in a wireless communication operating environment. For example, wireless communication may be implemented by a WLAN (wireless local area network) operating environment (WLAN 12) or by direct Bluetooth® or any communications technology on a personal area network (PAN) between the various components of electronic audience monitoring system 10 and one or more audio and/or video media playback devices, i.e., user devices 44, including but not limited to a mobile device 44a or television 44b, as hereinafter described.

In the depicted embodiment, WLAN 12 is communicatively connected to a WAN (wide area network) operating environment, designated by the reference numeral 14. Within WLAN 12, various client devices 16, such as monitoring devices 18 and sensors 20, are wirelessly networked to a base station or high frequency hub 24 which, in turn, communicates with the WAN 14 via a gateway hub, shown as gateway router 28. Base station hub 24 includes a processor 24a for providing internal computing capabilities, as hereinafter described. Base station hub 24 and router 28 provide a high frequency connection to WAN 14. Base station hub 24 may be eliminated as a stand-alone module if its functionality is incorporated into gateway router 28, in which case gateway router 28 also serves as a base station hub. The system may also include a security hub 26 that communicates with monitoring device(s) 18 and with the WAN 14 and provides a low frequency connection between the WAN 14 and monitoring devices 18. If present, security hub 26 may also communicate with the router or hub 28, such as through a high frequency communication path 52 and/or a low frequency communication path 54 to the router 28. The security hub 26 is also provided with a processor 26a for providing internal computing capabilities, as hereinafter described, and has the capability of providing a high frequency connection with audience monitoring devices 18. A public key for encrypting data transmitted by base station hub 24 and/or security hub 26 may be saved thereon. As is known, a public key is a cryptographic key comprising a mathematical algorithm implemented in software (or hardware) that may be used to encrypt data. The public key is a string of bits that are combined with the data using an encryption algorithm to create ciphertext, which is unreadable. In order to decrypt the encrypted data, a private key must be used. As is known, a private key is a cryptographic key comprising a mathematical algorithm implemented in software (or hardware) that may be used to decrypt data encrypted utilizing a public key. The private key decrypts the encrypted data back to plaintext, which is readable. The private key is saved in a memory in one or more of the user devices 44.

Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into router 28, in which case router 28 becomes the base station hub, as well as the router. Another connection between WLAN 12 and WAN 14 may be provided between security hub 26 and mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of electronic audience monitoring system 10 to interact with a backend system or control services that can control functions or provide various processing tasks of components of system 10, shown as a cloud-based backend control service system 34, which could be an Arlo SmartCloud™ system. The backend system, such as the cloud-based control service system 34, includes at least one server 36 and typically provides, for example, cloud storage of events, AI (artificial intelligence) based processing such as computer vision, and system access to emergency services. The public key may also be saved in computer-readable memory associated with cloud-based control service system 34, for reasons hereinafter described.

As noted above, electronic audience monitoring system 10 typically includes one or more audience monitoring devices 18 and/or sensors 20 that are mounted to face towards a respective area being monitored, such as the room or area containing a mobile device 44a, television 44b, monitor, projector, speaker, or other user device 44 configured for playback of audio and/or video media content. It is intended for audience monitoring devices 18 and/or sensors 20 to perform a variety of monitoring, sensing, and communicating functions. Each audience monitoring device 18 includes a firmware image stored in non-volatile memory thereon. As is conventional, the firmware image acts as the monitoring device's complete operating system, performing all control, monitoring and data manipulation functions. In addition, the public key may also be saved in computer-readable memory associated with each audience monitoring device 18.

Figure 2:
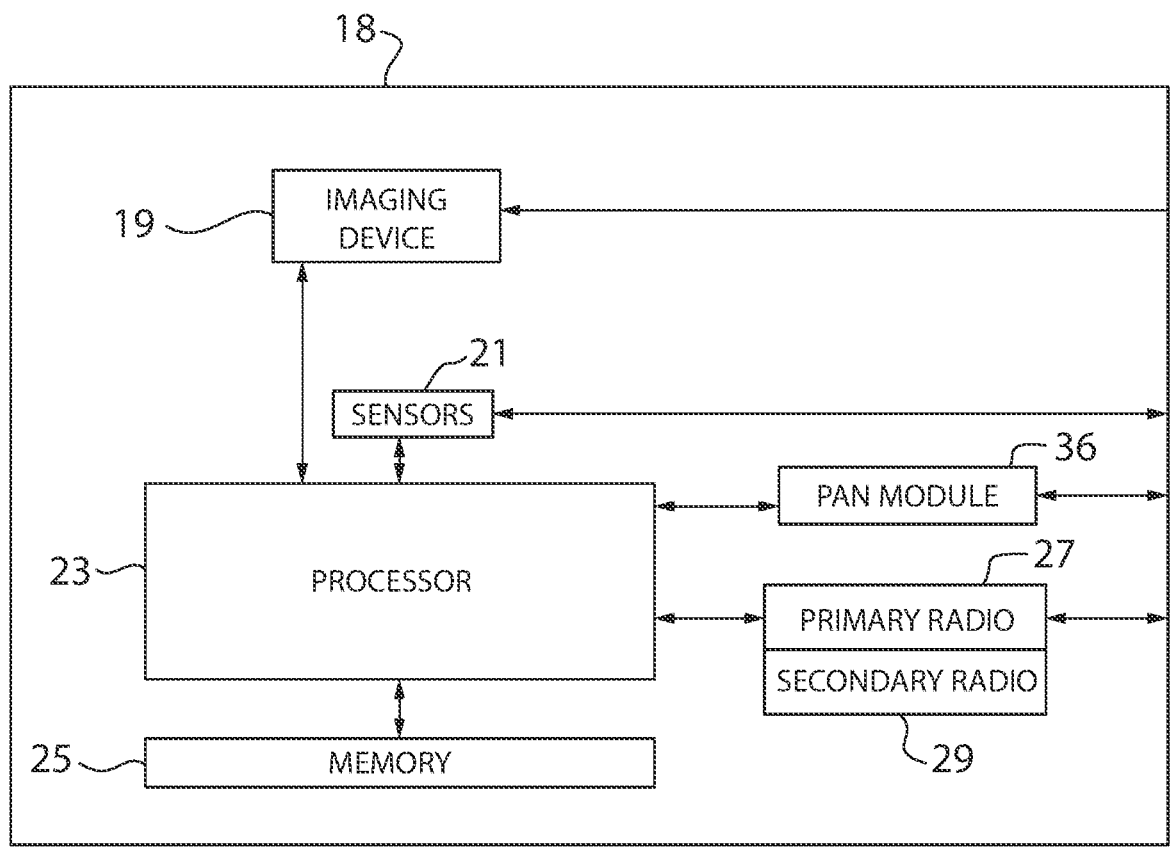
FIG. 2 schematically illustrates the internal circuitry of one of the monitoring devices of the system of FIG. 1.

Referring to FIG. 2, by way of nonlimiting example, one such audience monitoring device 18 may include an imaging device 19, such as a smart camera, that is configured to capture, store and transmit visual images and/or audio recordings of the monitored area within the environment, e.g., an Arlo® camera available from Arlo Technologies, Inc. of Carlsbad, California. In addition to containing a camera, the audience monitoring device 18 may also include one or more sensors configured to detect one or more types of conditions or stimuli, for example, motion, opening or closing events of doors, temperature changes, etc. Instead of or in addition to containing sensors, audience monitoring device 18 may have audio device(s) such as microphones, sound sensors, and speakers configured for audio communication. Other types of audience monitoring devices 18 may have some combination of sensors 20 and/or audio devices without having imaging capability. Sensors 20 or other audience monitoring devices 18 also may be incorporated into form factors of other house or building accessories, such as doorbells, floodlights, etc.

Still referring to FIG. 2, each audience monitoring device 18 includes circuitry, including a main processor 23 and/or an image signal processor, and computer-readable memory 25 associated therewith. It is further contemplated to store the public key in computer-readable memory associated with each audience monitoring device 18. The circuitry, the main processor 23, the computer-readable memory 25 and the public key are configured to allow the audience monitoring device 18 to perform a variety of tasks including, but not limited to, capturing a video image with the smart camera and the metadata associated with the image (e.g. the time and date that image was captured); encrypting each frame of video image using the public key; processing the captured video image to generate an enhanced video image from the encrypted frames of the video image; controlling the acquisition and transmission of data; and transmitting an enhanced media stream to a respective hub 24 and/or 26 for further processing and/or further transmission to a server, such as the server 36 of the cloud-based control service system 34, and/or communication with user device(s) 44. It can be appreciated that the main processor 23 and/or the image signal processor may perform additional tasks without deviating from the scope of the present invention. For example, the image signal processor can toggle between: 1) a low power mode in which the image signal processor performs only essential tasks to insure proper operation of the smart camera, thereby minimizing the electrical power drawn from a battery used to power a corresponding monitoring device 18; and 2) an operation mode, in which the image signal processor is awake and capable of performing all programmed tasks.

In order to allow for low and high frequency communication on WLAN 12, it is contemplated for monitoring devices 18 to have two radios operating at different frequencies. Referring again to FIG. 2, a first, "primary" radio 27 operates at a first frequency, typically at a relatively high frequency, typically of 2.4 GHz to 5 GHZ, during periods of normal conductivity to perform monitoring and data capture functions such as video capture and transmission, sound transmission, motion sensing, etc. The second or "secondary radio" 29 operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted, in order to permit the continued operation of monitoring devices 18, as well as, to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each audience monitoring device 18 to include Bluetooth® or any PAN communications module 36 designated for wireless communication. As is known, module 36 allows audience monitoring devices 18 to communicate directly with one or more user devices 44 over a wireless Personal Area Network (PAN) 38. Likewise, sensors 20 may include Bluetooth® or any PAN communications module 45 to allow sensor 20 to communicate directly with one or more user devices 44 over a wireless Personal Area Network (PAN) 38, as shown in FIG. 1. In one embodiment of the present invention it should be understood that independent or stand-alone audience monitoring devices 18 and/or sensors 20 may be eliminated as standalone modules if their respective audience monitoring functionality is incorporated into the one or more user devices 44 configured for audio and/or video media playback, including but not limited to a mobile device 44a, television 44b, or other devices such as a tablet, laptop, PC, smart speaker, etc. By way of nonlimiting example, a mobile device 44a, television 44b, or other user device 44 may incorporate a front facing camera, or imaging device 19, and related circuitry allowing the user device 44 to function as both a media output device as well as an audience monitoring device 18, in which case the audience monitoring system 10 may function without standalone audience monitoring devices 18 and/or sensors 20.

Figure 3:
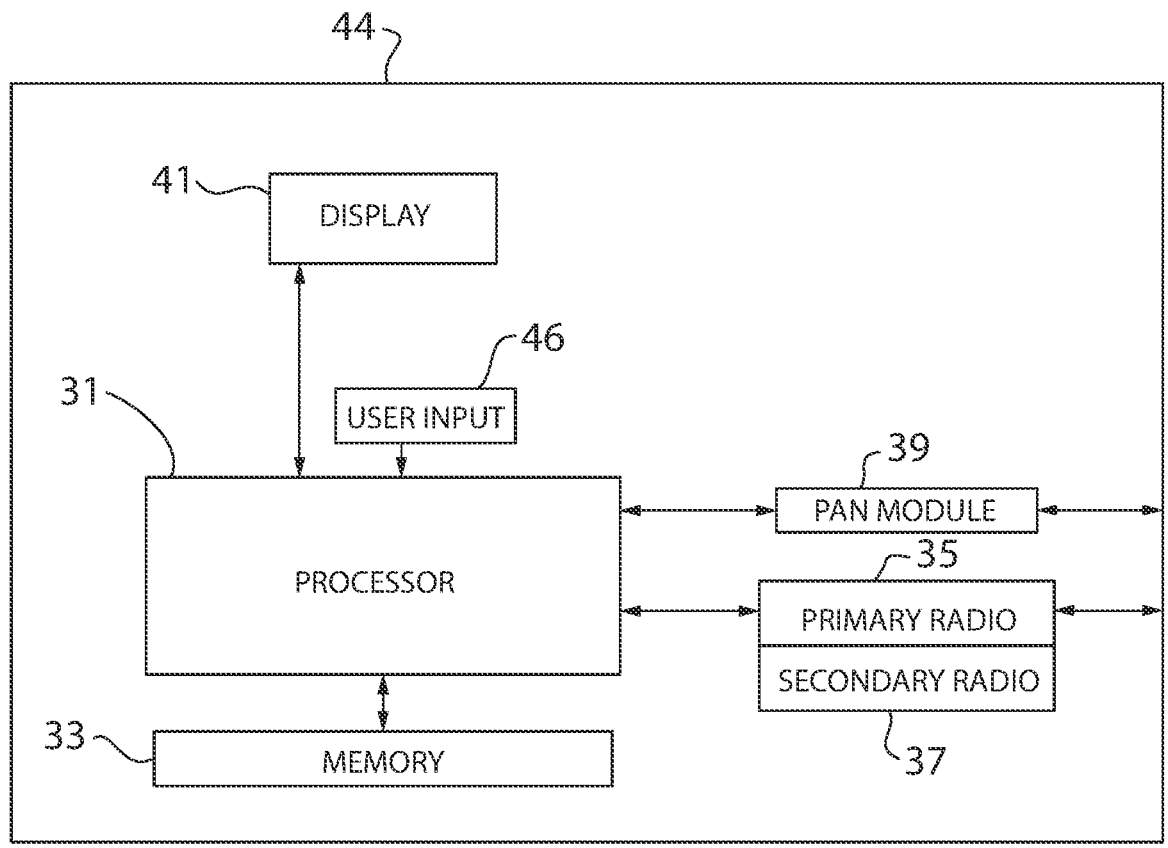
FIG. 3 schematically illustrates the internal circuitry of one of the user devices of the system of FIG. 1.

Referring to FIGS. 1 and 3, one or more user devices 44 configured for audio and/or video media playback, including but not limited to a mobile device 44*a*, television 44*b*, or other devices such as a tablet, laptop, PC, smart speaker, etc., may communicate with various components of electronic audience monitoring system 10. It can be understood that user devices 44 may communicate with the various components of electronic audience monitoring system 10 utilizing WLAN 12, WAN 14 and/or PAN 38 via primary radio 35, secondary radio 37 and PAN communications module 39, respectively, to provide an interface through which a user may interact with electronic monitoring system 10, including client devices 16. Each user device 44 includes an output 41 including an audio display and/or a video display for the playback of audio and/or video media content. In one embodiment the video output 41 may be a touchscreen configured to receive actuatable user input commands. In an alternative embodiment, the user device 44 may have a discrete user input 46, such as a keyboard, keypad, remote control, or microphone for receiving actuatable input commands. Referring to FIG. 3, each user device 44 may also have a processor 31 to allow for internal computing capabilities, computer-readable memory 33 and a program or application, such as the Arlo Smart application, serving as the user interface with the remainder of the audience monitoring system 10. In response to the information broadcast via the output 41 of the one or more user devices 44, a user may actuate the at least one actuatable user input command via user input 46 to address the information. A private key, used to decrypt data encrypted utilizing the public key and received by user device 44, is stored in the computer-readable memory associated with user device 44.

Referring back to FIG. 1, within WLAN 12, multiple communication paths 50 are defined that transmit data between the various components of audience monitoring system 10. Communication paths 50 include a default or primary communication path 52 providing communication between audience monitoring device 18 and the base station hub 26, and a fail-over or fallback secondary communication path 54 providing communication between monitoring device 18 and the security hub 26. Optionally, some of the audience monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52.

As described, electronic audience monitoring system 10 is configured to implement a seamless over the air (OTA) communication environment for each client device 16 by implementing a communication path switching strategy as a function of the operational state of primary and/or secondary communication paths, as heretofore described. For example, each audience monitoring device 18 is configured to acquire data and to transmit it to a respective hub 24 and/or 26 for further processing and/or further transmission to a server such as the server 36 of the cloud-based control service system 34 and/or the user device(s) 44. The server 36 or other computing components of audience monitoring system 10 or otherwise in the WLAN 12 or WAN 14 can include or be coupled to a microprocessor, a microcontroller or other programmable logic element (individually and collectively considered "a controller") configured to execute a program. The controller also may be contained in whole in the audience monitoring device 18, base station hub 24, security hub 26, and/or the WIFI hub or router 28. Alternatively, interconnected aspects of the controller and the programs executed by it could be distributed in various permutations within the audience monitoring device 18, the hubs 24 and 26, router 28, and the server 36. This program may be utilized in filtering, processing, categorizing, storing, recalling and transmitting data received from the monitoring device 18 via the hubs 24 and 26, router 28, and server 36. Server 36 or other appropriate system device may also be in communication with or include a computer vision program ("CV"), which can apply one or more filters or processes, such as edge detection, facial recognition, motion detection, etc., to detected one or more characteristics of the recording such as, but not limited to, identifying one or more individuals within the viewing or listening audience of the user device 44.

Figure 4:
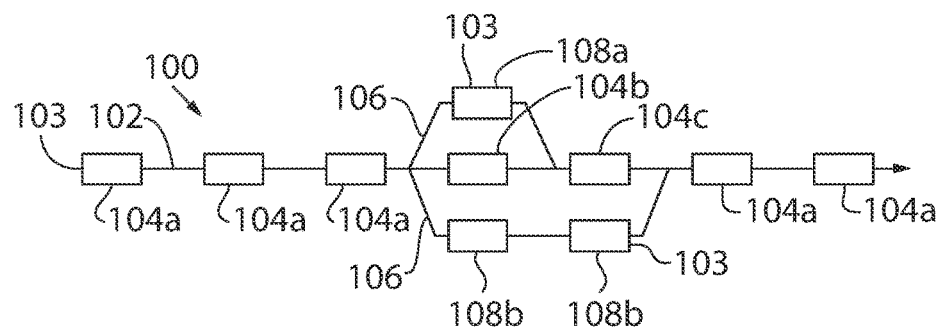
FIG. 4 is a block diagram of media content playback options according to aspects of the invention.

Turning now to FIG. 4, an example of dynamically masked media content 100 configured for playback within the electronic audience monitoring system 10 of the present invention is illustrated. The content 100 may be audio content and/or video content that is provided to the one or more user devices 44 via an internet-based content provider platform, website, an audio or video streaming service, a cable provider, or any other form of media distribution. The content 100 comprises original or unedited primary media 102 that is configured for playback from the one or more user devices 44. The content 100 that defines the totality of the primary media 102 is segmented into a plurality of primary media packets or chunks 103. As is generally known, individual primary media chunks 103 may be individually transmitted to the user device 44 such that the totality of the primary media 102 is not transmitted in its entirety, thereby reducing the data packet size to facilitate data buffering and transmission. Rather, the smaller chunks 103 are received sequentially at the user device 44 for sequential playback.

Still referring to FIG. 4, in accordance with one embodiment of the present invention, the individual chunks 103 that comprise the primary media 102 may be referred to as primary media chunks 104 generally. The primary media chunks 104 are categorized and tagged according to their respective content. For example, in an embodiment of the present invention in which the primary media 102 defines a feature film, the corresponding chunks 104 may be categorized according to potentially objectionable content contained within the corresponding chunk 104. Categories of objectionable content may include but are not limited to: suggestive dialogue, strong profanity, mild profanity, drug use, alcohol use, sexual situations, violence, nudity, etc. A metadata tag containing an indication of the objectionable content contained within the corresponding chunk 104 is linked to the chunk 104 and provided to the user device 44 along with the corresponding portion of media content 100. For example, chunk 104*a* may contain no objectional content; chunk 104*b* may contain and be metadata tagged to indicate the presence of violence and profanity; and chunk 104c may contain and be metadata tagged to indicate the presence of violence but not profanity.

Still referring to FIG. 4, in addition to primary media 102, the content 100 provided to the user device 44 may also include alternative or edited secondary media 106. The secondary media 106 is similarly segmented or partitioned into secondary media chunks 108, which each correlate in duration and position within the content 100 to a corresponding chunk 104 from the primary media 102. That is to say that the secondary media 106 contains an alternative or edited version of a subset of the content 100 relative to the primary media 102. The altered or edited version of the content 100, i.e., the secondary media 106, is identified by chunks 108, which correlate in storyline position to a corresponding primary media chunk 104 that may contain potentially objectionable content. Accordingly, the selected secondary media chunk 108 can be substituted for a primary media chunk 104 in order to provide a playback of content 100 that conforms to the audience viewing preferences without disruption to the storyline, plot, or audience viewing experience, as will be described in further detail below. To this end, the individual secondary media chunks 108 may also be categorized and tagged according to their respective content. For example, in the context of the previously discussed embodiment of the present invention in which the primary media 102 defines a feature film, the corresponding secondary media chunks 108 may also be categorized according to potentially objectionable content contained within the corresponding secondary chunks 108, or alternatively a lack thereof. A metadata tag containing an indication of the objectionable content or absence of objectionable content contained within the corresponding secondary chunk 108 is linked to the secondary chunk 108 and provided to the user device 44 along with the corresponding portion of media content 100. For example, chunk 108a may contain and be metadata tagged to indicate the presence of violence but no profanity; and chunk 108b may contain and be metadata tagged to indicate the presence of no violence and no profanity. In addition to the metadata tag identifying the indication of the objectionable content or absence of objectionable content contained within the corresponding secondary chunk 108, the metadata tag may also contain a timestamp to indicate its position for playback with the overall content 100, such that if applicable, it may be selected for playback at an appropriate time.

Still referring to FIG. 4 in the context of the previously discussed embodiment of the present invention in which the primary media 102 defines a feature film, an audience member may specify viewer preferences within the audience monitoring system 10, as will be described in further detail below. If the audience member's viewer preferences allow for playback of violence and profanity, the content 100 for playback from the user device 44 will include all chunks 104a, 104b and 104c from the primary media 104, which may include both violence and profanity. Alternatively, if the audience member's viewer preferences allow for playback of violence but not profanity, the content 100 for playback from the user device 44 will include chunks 104a and 104c from the primary media 104, which may include violence. However, in lieu of playback of chunk 104b, which contains violence and profanity, system 10 will alternatively play corresponding chunk 108a, which masks profanity from playback at user device 44. Still further, if the audience member's viewer preferences allow for playback of neither violence nor profanity, the content 100 for playback from the user device 44 will include chunks 104a from the primary media 104, which do not include violence or profanity. However, in lieu of playback of chunks 104b and 104c, which contains violence and/or profanity, system 10 will alternatively play corresponding chunk 108a, 108b, which masks both violence and profanity from playback at user device 44. Accordingly, the playback of content 100 through audience monitoring system 10, according to the present invention allows for dynamic masking of variably selected portions of the media content 100 based upon real-time audience composition and their corresponding viewer preferences.

Figure 5:
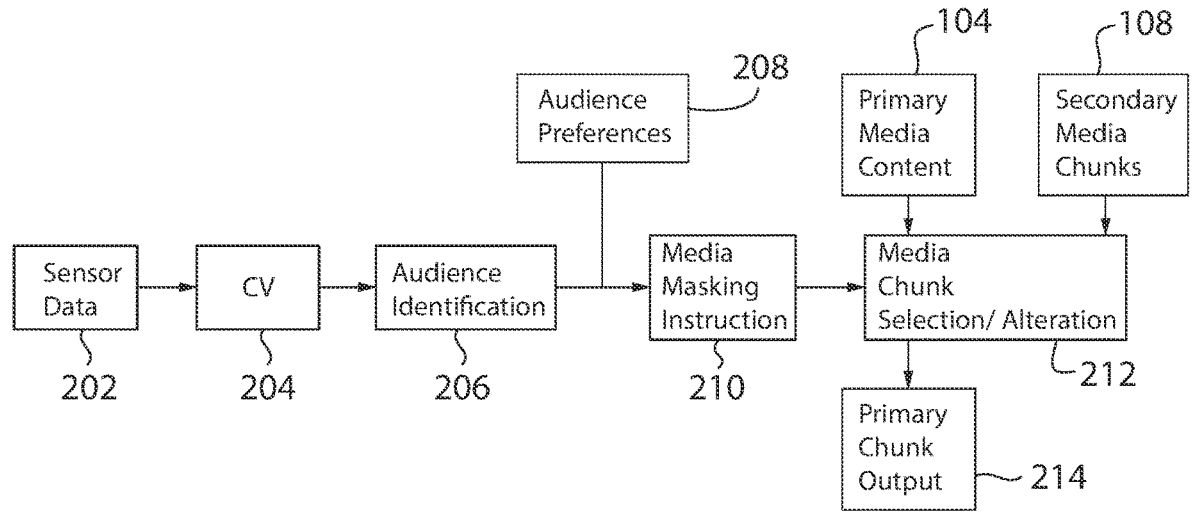
FIG. 5 is a flow chart illustrating a process of selection of media chunks according to aspects of the invention; and, FIG. 6 is a flow chart illustrating a process of generating, selecting and playback of media chunks according to aspects of the invention.

Turning now to FIG. 5, flow chart 200 depicts one embodiment of a process for selecting chunks 103 for playback from a user device 44 within the audience monitoring system 10 in order to apply viewer preference specified masking. Initially at block 202, sensor data is collected from the audience monitoring devices 18 and or sensors 20. More specifically, after activation of the system 10, the audience monitoring device 18 and/or sensors 20 can begin monitoring the audience area for triggering events. The audience monitoring devices 18 can monitor for both genus and species level categorized triggering events, such as motion or sound produced by an audience member, for example, using imaging device 19 of the audience monitoring device 18, microphones 21 and/or motion sensors 20, in various configurations, including as described above with respect to FIG. 1. If the audience monitoring devices 18 and or sensors 20 detect a triggering event, for example the presence of an audience member, the audience monitoring devices 18 can begin capturing and recording data from the audience monitored area in block 202, where the image and sound collected by the audience monitoring devices 18 are transmitted to a respective hub 24 and/or 26 for further processing and/or further transmission to a server such as the server 36 of the cloud-based control service system 34 and/or the user device(s) 44.

At subsequent block 204, the image and sound collected by the audience monitoring device 18, are received by the server 36, which may include a computer vision program ("CV"), which can apply one or more filters or processes, such as edge detection, facial recognition, motion detection, voice detection, etc., to detected one or more characteristics of the recording such as, but not limited to, identifying one or more individuals on a genus and/or species level within the viewing or listening audience of the user device 44.

Based on the application of the computer vision program, and audience identification is output at block 206. The audience identification output at block 206 may be categorized at either a genus level and/or a species level. The terms "genus" and "species" as used herein simply refer to a set and a subset of that set respectively. There can be various levels of genus and species. For example, an individual person can be considered a genus and a child could be a species within that genus. Drilling down a level further, a child under the age of 10 could be a species of the genus of child. Drilling down still a level further, Jill could be a species of the genus children under the age of 10. The levels between the uppermost level and the bottom-most level also could be considered "subgenuses." For the sake of simplicity, unless otherwise noted in a particular example, the term "genus" will encompass both genuses and subgenuses. By providing event details in the push notification, such as an audio indication of the triggering event, the monitoring system can be greatly improved.

Upon identification of the audience member at block 206, the audience monitoring system 10 then identifies the applicable viewer preferences at subsequent block 208. The audience preferences may be predetermined and customized based on either genus or species level viewer. That is to say that an audience member identified at the species level as an individual person, i.e., Jill, may have preset audience preferences stored in the system 10. Alternatively, an audience member that is identified at the genus level, as for example a child under the age of 10, may have different preset audience preferences stored in the system 10. Audience preferences may include various categories of objectionable content, which may include but are not limited to: suggestive dialogue, strong profanity, mild profanity, drug use, alcohol use, sexual situations, violence, nudity, etc. Within the audience monitoring system 10, the backend system, such as the cloud-based control service system 34, may store and recall the preselected audience preferences upon identification at prior step 206. Alternatively, the preselected audience preferences may be stored directly at the user device 44, independent of the server 36.

Based upon the identification of the audience member at block 206 and recall of the corresponding audience preferences at block 208 a media masking instruction is generated at block 210. The media masking instruction generated at block 210 will direct the user device 44 to select the corresponding chunk 103 of media content 100, consisting of either primary media chunks 104 or secondary media chunks 108 based upon the metadata tag of the corresponding chunk 104, 108.

At block 212 the user device 44 will receive the media masking instruction from block 210 along with the primary media chunks 104 and secondary media chunks 108, and select the corresponding chunk 104, 108 for playback. In one embodiment of the invention, as discussed above in the context of content 100 shown in FIG. 4, the user device 44 may select secondary media chunks 108 for playback in lieu of primary media chunks 104, in order to mask the primary media content 100 in accordance with the audience's predetermined preferences. In an alternative embodiment of the invention in which a secondary media chunk 108 has not been provided for masking a corresponding chunk 104 of the primary media content 100, the playback of which would violate an audience preference, the system 10 can apply a masking alteration to the corresponding chunk 104, such as audio and/or visual distortion. In yet another embodiment of the invention, the masking alteration may be implemented by an artificial intelligence ("AI") program within the server 36 or user devices 44, which minimizes adverse impact to playback of the media content 100, while ensuring compliance with the audience preferences from block 208.

At final block 214, the selected media chunk 103 is output from the user device for playback to the audience member according to their custom audience preferences. It should be further understood that the process 200 as described in FIG. 5 is repeated throughout playback of the content 10 from the user device 44. That is to say that while playback of the content is occurring the audience monitoring system 10 is continually collecting sensor data at block 202 and providing a corresponding media chunk output at block 214. Accordingly, the system 10 is dynamic in its real-time modification of the media chunk output 214 based upon variances in the audience composition as detected through the sensor data at block 202. For example, if a feature film is being output from the user device 44 in which the primary media chunks 104a contain violence, the corresponding output media chunks 104 will be output as long as the preferences from block 208 corresponding to the audience identified at block 206 allow for the output of media 100 containing violence. However, if a child, i.e., Jill, with present audience preferences that do not allow output of media 100 containing violence 100, enters the audience monitoring area of system 10 and her presence is identified at box 206, the system 10 will dynamically adjust the corresponding masking instructions at block 210 to generate a media chunk output at block 214 that includes secondary media chunks 108 that is devoid of violence. Then, when Jill exits the audience monitoring area of system 10, the audience identification block 206 will identify her absence and automatically revert the media masking instructions generated at block 210 to allow the playback of primary media chunks 104 that contain violence. Accordingly, the playback of content 100 through audience monitoring system 10, according to the present invention allows for dynamic masking of variably selected portions of the media content 100 based upon real-time audience composition and their corresponding viewer preferences.

Figure 6:
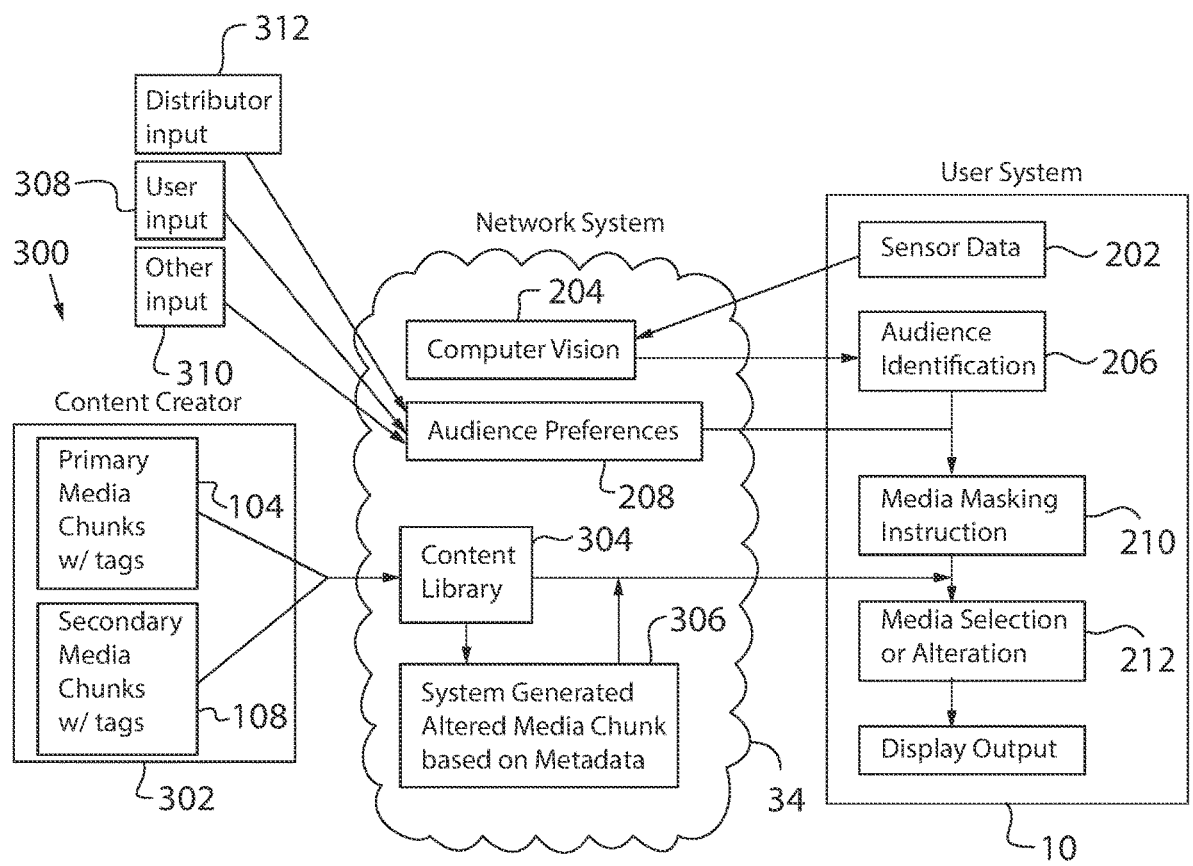

Turning now to FIG. 6, a flow chart 300 of one embodiment of the audience monitoring system 10 is provided. Beginning at block 302, the content creator 302 creates content 100 that includes both primary media chunks 104 and secondary media chunks 108, both of which include metadata tags to identify the potentially objectionable content contained therein. While not so limited, content creators 302 according to the present invention may include TV or film production studios, streaming services, musical artists, internet content creators, or the like.

The content 100 is then uploaded to content library 304 which may be accessible to the backend system of the audience monitoring system 10, such as the cloud-based control service system 34. As discussed above, also stored at the cloud-based control service system 34 and/or at a server 36 located therein is a database of prespecified audience preferences 208, a computer vision ("CV") system 204, and a program for generating altered media chunks in the absence of a corresponding secondary media chunk 108, for example an AI based masking program 306. It should be understood that while the above listed components are described as being located on a cloud-based control service system 34 and/or at a server 36 located therein, it is well within the scope of the present invention that any one or more of the above listed components be located on a user device 44 or within the WLAN operating environment 12 of system 10.

As described above, the database of prespecified audience preferences 306 may be populated with either genus or species level specificity-based audience preferences for media content playback. Furthermore, in one embodiment the database of prespecified audience preferences 306 may be specified by an individual user 312 in order to reflect the personal preferences of themselves, family members, friends etc. In an alternative embodiment the database of prespecified audience preferences 306 may be specified by a third party 314, such as a commercial business that utilizes user devices 44 for viewing and wishes to specify audience preferences that are deemed appropriate for playback in a commercial business environment. In yet another alternative embodiment the database of prespecified audience preferences 306 may be specified by a content distributor 316, such as a tv channel that wishes to broadcast a feature film in a manner that conforms to programming guidelines for public viewing.

Still referring to FIG. 6, once the content 100 has been uploaded to the library 304 and the audience preferences 306 specified, the audience monitoring system 10 collects sensor data at block 202 through the use of audience monitoring devices 18 and/or sensors 22, which may be stand alone or incorporated into the user device 44. Sensor data 202 is transmitted to the computer vision ("CV") system 204 on the cloud-based control service system 34 and/or at a server 36 located therein, to detected one or more characteristics of the sensor data, including but not limited to, identifying one or more individuals on a genus and/or species level within the viewing or listening audience of the user device 44. At subsequent block 206, the audience identification is made and provided to the system 10, which received the corresponding audience preference from block 208 to generate the corresponding media masking instructions at block 210. The media masking instruction generated at block 210 will direct the user device 44 to select the corresponding chunk 103 of media content 100, consisting of either primary media chunks 104 or secondary media chunks 108 based upon the metadata tag of the corresponding chunk 104, 108.

At block 212 the user device 44 will receive the media masking instruction from block 210 along with the primary media chunks 104 and secondary media chunks 108 provided from the content library 304, and select the corresponding chunk 104, 108 for playback. As discussed above, in one embodiment, the user device 44 may select secondary media chunks 108 for playback in lieu of primary media chunks 104, in order to mask the primary media content 100 in accordance with the audience's predetermined preferences provided at block 208. In an alternative embodiment of the invention in which a secondary media chunk 108 has not been provided for masking a corresponding chunk 104 of the primary media content 100, the playback of which would violate an audience preference, the process 300 can apply a masking alteration to the corresponding chunk 104, such as audio and/or visual distortion, for example by generating through the use of an artificial intelligence ("AI") program within the cloud-based control service system 34 and/or at a server 36 located therein, in an effort to minimize adverse impact to playback of the media content 100, while ensuring compliance with the audience preferences from block 208.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. A method of variably masking portions of media during playback, comprising the:
    using a content creator, generating common media content that comprises both primary media chunks and secondary media chunks each of which correlates in duration and position within the common media content and includes metadata tags to identify content contained therein;
    populating a content library with the media content generated by the content creator prior to initiating playback of media content,
    preselecting preferences for playback of media content corresponding to one or more members of an audience prior to initiating playback of media content;
    identifying the one or more members of the audience for playback of media content;
    automatically retrieving the preselected preferences for playback of media content corresponding to the one or more members of the audience based upon their identification;
    generating a media masking instruction according to the preselected preferences;
    outputting, to a user device, a masked media content correlating to the instruction while maintaining uninterrupted playback of the content at the user device, and wherein the masked media content comprises a combination of at least one primary media chunk and at least one secondary media chunk.

2. The method of claim 1, wherein an alteration to the media masking instruction while outputting the masked media to the user device results in a modification to the masked media content.

3. The method of claim 2, wherein the step of identifying one or more members of an audience for playback of media content occurs repeatedly while outputting the masked media to the user device.

4. The method of claim 1, wherein the masked media content is defined by a combination of an at least one primary media chunk and an at least one secondary media chunk that each conform to the preselected preferences.

5. The method of claim 4, wherein the at least one primary and secondary media chunks contain metadata tags corresponding to the preselected preferences.

6. The method of claim 1, wherein the step of identifying one or more members of an audience for playback of media content includes collecting sensor data from an audience monitoring device and applying a computer vision program to sensor data to generate an audience identification.

7. The method of claim 6, wherein the audience identification is a genus level identification.

8. The method of claim 6, wherein the audience identification is a species level identification.

9. The method of claim 1, wherein the preselected preferences are selected from a group consisting of suggestive dialogue, strong profanity, mild profanity, drug use, alcohol use, sexual situations, violence, and nudity.

10. A system for variably masking portions of media during playback, the system comprising:
    a content library with media content generated by a content creator, the media content comprising common media content including both primary media chunks and secondary media chunks, each of which correlates in duration and position within the common media content and includes metadata tags to identify the content contained therein;
    an audience monitoring device configured to record data from an audience of a user device configured for media playback;
    a computer vision system configured to identify at least one member of the audience from the data received from the monitoring device; and
    a database of preselected audience preferences compiled prior to initiating playback of media content, the database configured to provide a masking instruction corresponding to the identified at least one member of the audience based upon their identification; wherein
        the user device is configured to output a masked content during media playback correlating to the masking instruction while maintaining uninterrupted playback of the content at the user device; and wherein the masked media content comprises a combination of at least one primary media chunk and at least one secondary media chunk.

11. The system of claim 10, wherein the masked media content is comprised of one or more primary media chunks and one or more secondary media chunks stored at a network based content library.

12. The system of claim 11, wherein the primary and secondary media chunks each have a metadata tag indicating content contained therein that correlates to one or more categories of the preselected audience preferences.

13. The system of claim 12, wherein the categories of the preselected audience preferences are selected from a group consisting of suggestive dialogue, strong profanity, mild profanity, drug use, alcohol use, sexual situations, violence, and nudity.

14. The system of claim 10, wherein the audience monitoring device is configured to repeatedly record data from an audience of the user device configured for media playback while outputting the masked media to the user device.

15. The system of claim 10, wherein the masking instruction is configured to be modified during media playback corresponding to changes in a composition of the audience.

* * * * *